(12) United States Patent
Kobayashi

(10) Patent No.: US 7,521,898 B2
(45) Date of Patent: Apr. 21, 2009

(54) CHARGER, DC/DC CONVERTER INCLUDING THAT CHARGER, AND CONTROL CIRCUIT THEREOF

(75) Inventor: Kimiyoshi Kobayashi, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 304 days.

(21) Appl. No.: 10/590,244

(22) PCT Filed: Feb. 14, 2005

(86) PCT No.: PCT/JP2005/002113

§ 371 (c)(1),
(2), (4) Date: Aug. 22, 2006

(87) PCT Pub. No.: WO2005/083868

PCT Pub. Date: Sep. 9, 2005

(65) Prior Publication Data

US 2007/0138996 A1    Jun. 21, 2007

(30) Foreign Application Priority Data

Feb. 27, 2004   (JP) .............................. 2004-052596
Feb. 27, 2004   (JP) .............................. 2004-052597

(51) Int. Cl.
H02J 7/04        (2006.01)
(52) U.S. Cl. .................. 320/162; 320/140; 320/101
(58) Field of Classification Search .............. 320/101, 320/103, 140, 148, 160, 162; 324/433
See application file for complete search history.

(56) References Cited

U.S. PATENT DOCUMENTS 5,465,039 A * 11/1995 Narita et al. ................ 320/164
6,262,558 B1 * 7/2001 Weinberg .................... 320/101
2003/0067283 A1 * 4/2003 Takimoto et al. ............ 320/162

FOREIGN PATENT DOCUMENTS

| JP | 06-083466 A  | 3/1994  |
| JP | 63-164382 U  | 10/1998 |
| JP | 11-341699 A  | 12/1999 |

OTHER PUBLICATIONS

International Search Report.

* cited by examiner

*Primary Examiner*—Akm E. Ullah
*Assistant Examiner*—Aaron Piggush
(74) *Attorney, Agent, or Firm*—Rader, Fishman & Grauer PLLC; Ronald P. Kananen

(57) ABSTRACT

A new charger wherein a reference voltage can be set therein. The charger charges a secondary battery via a DC/DC converter that has an arrangement in which a fuel cell, a solar cell or the like having a relatively large output impedance during power supply is used as an input source (Vfc) and an input power is kept constant. The secondary battery (B) is connected to a control circuit (10), and a constant power reference voltage control circuit (20) is connected between the current control circuit and an input of the charger. When the output of the charger is drooping, the constant power reference voltage control circuit reduces the reference voltage to increase the power to be supplied, thereby providing a constant power at the voltage as defined by the output voltage stabilization control of the charger. When the input power of the charger is excessive, the constant power reference voltage control circuit increases the reference voltage to set a reference value corresponding to the power to be supplied.

6 Claims, 3 Drawing Sheets

US 7,521,898 B2

CHARGER, DC/DC CONVERTER INCLUDING THAT CHARGER, AND CONTROL CIRCUIT THEREOF

TECHNICAL FIELD

The present invention relates to a charger for obtaining necessary power of a fuel cell, a DC-DC converter including the charger, and a control circuit thereof.

BACKGROUND ART

In a DC-DC converter of the related art in which a fuel cell, a solar cell, or the like, is used as an input source, as a means for achieving stabilization of input power by controlling an input voltage to be constant, the input voltage being lowered by an operation of an output impedance when power is supplied, a means shown in FIG. 7 has been employed in which, when input supply power Pin is less than output supply power Pout, an input voltage is made constant, so that an output voltage enters a drooping state, and in which, when the input supply power Pin is greater than output supply power Pout, the input voltage rises, so that the output voltage becomes constant (regarding a solar cell, see, for example, Patent Document 1).

However, in the case of employing such a means, when the input supply power Pin is greater than output supply power Pout, the input voltage rises. Accordingly, in particular, when a fuel cell is used as an input source, a problem occurs in that a rapid change in voltage environment results in deterioration of the cell because the fuel cell uses chemical reactions to generate power. In addition, an operating voltage of the fuel cell varies depending on factors such as a cell temperature and a chemical reaction. For example, the fuel cell has a feature in that the amount of power that can be supplied varies depending on a difference in cell temperature even at the same operating voltage.

Accordingly, to solve the above problem, the present inventor has invented the DC-DC converter shown in FIG. 8, which is configured so that, an optimized reference voltage is input from the outside, and an arbitrary value of voltage-control input for controlling an input voltage of the DC-DC converter and an output voltage of a fuel cell are input so that a control signal is output (see, for example, Patent Document 2).

Patent Document 1: Japanese Unexamined Patent Application Publication No. 11-341699

Patent Document 2: Japanese Patent Application Publication No. 2003-388747

DISCLOSURE OF INVENTION

Problems to be Solved by the Invention

However, for even the DC-DC converter having the above-described configuration, in the case of an external input, it is necessary to collectively unify cell-characteristic information into an electric signal as an input signal, so that the circuit thereof becomes a complicated. In addition, its usability is not good.

The present invention has been made in view of the above problems, and provides a novel charger capable of setting a reference voltage in a DC-DC-converter interior, and a DC-DC converter including the charger.

Means for Solving the Problems

To solve the above problems, a charger according to the present invention chargers a secondary battery through a charging unit configured to control input power to be constant by using, as an input source, a fuel cell, a solar cell, or the like, having a relatively large output impedance when power is supplied, wherein a current-control circuit is connected to the secondary battery, a constant-power-reference-voltage control circuit is connected between the current-control circuit and an input of the charger, and the constant-power-reference-voltage control circuit is configured so that, when an output of the charger is in a drooping state, by decreasing a reference voltage to increase supply power, constant power is obtained at a voltage determined by output-voltage-stabilizing control of the charger, and, when input power to the charger is in an excessive state, by raising the reference voltage, a reference value corresponding to the supply power is set.

The constant-power-reference-voltage control circuit includes two constant current circuits, an input-voltage detecting comparator, an output-voltage detecting comparator, and a reference-voltage capacitor, and the constant-power-reference-voltage control circuit is configured so that, when an output detected by the output-voltage detecting comparator is in a drooping state, by causing the reference-voltage capacitor to discharge through the constant current circuit to raise the output voltage, constant power is obtained at the voltage determined by controlling the output voltage of the charger to be stabilized, and, when input power detected by the input-voltage detecting comparator is in an excessive state, by charging the reference-voltage capacitor through the constant current circuit, the reference value corresponding to the supply power is set.

A control circuit in a charger according to the present invention is a control circuit in the charger for controlling input power to be constant by using, as an input source, a fuel cell, a solar cell, or the like, having a relatively large impedance in a power-supply mode, the control circuit including a constant-power-reference-voltage control circuit in which, when an output of the charger is in a drooping state, by decreasing a reference voltage to increase supply power, constant power is obtained at a voltage determined by output-voltage-stabilizing control of the charger, and, when input power to the charger is in an excessive state, by raising the reference voltage, a reference value corresponding to the supply power is set.

The constant-power-reference-voltage control circuit includes two constant current circuits, an input-voltage detecting comparator, an output-voltage detecting comparator, and a reference-voltage capacitor, and the constant-power-reference-voltage control circuit is configured so that, when an output detected by the output-voltage detecting comparator is in a drooping state, by discharging the reference-voltage capacitor through the constant current circuit to raise the output voltage, constant power is obtained at the voltage determined by output-voltage-stabilizing control of the charger, and, when input power detected by the input-voltage detecting comparator is in an excessive state, by charging the reference-voltage capacitor through the constant current circuit, the reference value corresponding to the supply power is set.

Also, the control circuit further includes a secondary battery at an output of the charger in parallel to an arbitrary load, and a current control circuit connected to the secondary battery, and the current control circuit is configured so that, by performing control so that, when a current in the load decreases, a charging current flowing into the secondary battery is increased, and, when the current in the load increases, the charging current to the secondary battery is decreased, an output voltage is maintained at a set drooping voltage.

A DC-DC converter according to the present invention is a DC-DC converter for controlling input power to be constant by using, as an input source, a fuel cell, a solar cell, or the like, having a relatively large output impedance in a power-supply mode, the DC-DC converter including a charger as set forth in claim 1, and a secondary battery at an output in parallel to an arbitrary load, wherein a current control circuit is connected to the secondary battery, and a constant-power-reference-voltage control circuit is connected between the current control circuit and an input of the DC-DC converter, and the constant-power-reference-voltage control circuit is configured so that, when an output of the DC-DC converter is in a drooping state, by decreasing a reference voltage to increase supply power, constant power is obtained at a voltage determined by output-voltage-stabilizing control of the DC-DC converter, and, when input power to the DC-DC converter is in an excessive state, by raising the reference voltage, a reference value corresponding to the supply power is set.

The constant-power-reference-voltage control circuit includes two constant current circuits, an input-voltage detecting comparator, an output-voltage detecting comparator, and a reference-voltage capacitor, and the constant-power-reference-voltage control circuit is configured so that, when an output detected by the output-voltage detecting comparator is in a drooping state, by discharging the reference-voltage capacitor through the constant current circuit to raise the output voltage, constant power is obtained at the voltage determined by output-voltage-stabilizing control of the charger, and, when input power detected by the input-voltage detecting comparator is in an excessive state, by charging the reference-voltage capacitor through the constant current circuit, the reference value corresponding to the supply power is set.

A control circuit in a DC-DC converter according to the present invention is a control circuit in the DC-DC converter for controlling input power to be constant by using, as an input source, a fuel cell, a solar cell, or the like, having a relatively large impedance in a power-supply mode, the control circuit including a constant-power-reference-voltage control circuit in which, when an output of the DC-DC converter is in a drooping state, by decreasing a reference voltage to increase supply power, constant power is obtained at a voltage determined by output-voltage-stabilizing control of the DC-DC converter, and, when input power to the DC-DC converter is in an excessive state, by raising the reference voltage, a reference value corresponding to the supply power is set.

The constant-power-reference-voltage control circuit includes two constant current circuits, an input-voltage detecting comparator, an output-voltage detecting comparator, and a reference-voltage capacitor, and the constant-power-reference-voltage control circuit is configured so that, when an output detected by the output-voltage detecting comparator is in a drooping state, by discharging the reference-voltage capacitor through the constant current circuit to raise the output voltage, constant power is obtained at the voltage determined by output-voltage-stabilizing control of the charger, and, when input power detected by the input-voltage detecting comparator is in an excessive state, by charging the reference-voltage capacitor through the constant current circuit, the reference value corresponding to the supply power is set.

The control circuit further includes a secondary battery at an output of the DC-DC converter in parallel to an arbitrary load, and a current control circuit connected to the secondary battery, wherein the current control circuit is configured so that, by performing control so that, when a current in the load decreases, a charging current flowing into the secondary battery is increased, and, when the current in the load increases, the charging current to the secondary battery is decreased, an output voltage is maintained at a set drooping voltage.

Advantages

According to a charger of the present invention, a control circuit of the charger includes a constant-power-reference-voltage control circuit, and the constant-power-reference-voltage control circuit has a configuration in which, when an output of the charger is in a drooping state, by decreasing the reference voltage, supply power is increased to raise an output voltage, whereby power is made constant, and, when an input to the charger rises, by raising the reference voltage, a reference value that matches the supply power is set. In this configuration, an advantage is obtained in that a change in reference voltage can be gradually carried out, thereby preventing deterioration to which the fuel cell is vulnerable due to a rapid change in output characteristics. In addition, also in a DC-DC converter of the present invention, a similar advantage can be obtained.

REFERENCE NUMERALS

Figure 1:
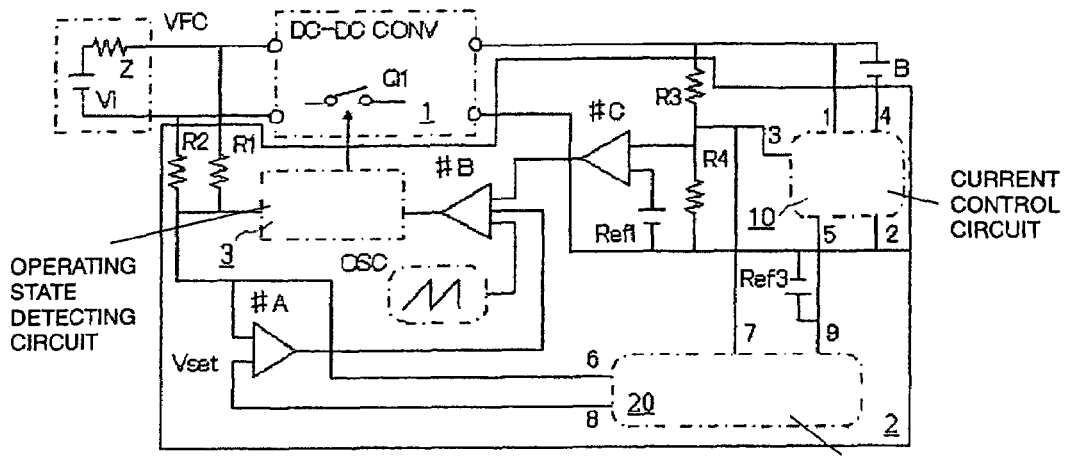
FIG. 1 is a circuit diagram of a best mode for realizing a charger according to the present invention.

Vfc Input source (fuel cell)
Vset Voltage control input
Ro Load
B Second battery
1 DC-DC-converter main section
2 Control circuit
3 Operating state detecting circuit
10 Current control circuit
11 Comparing circuit
12 Constant-current control circuit

20 Constant-power-reference-voltage control circuit
21,22 Constant current circuits
A Differential amplifier
B Comparator
C Voltage detector
D Comparator
E Input-voltage detecting comparator
F Output-voltage detecting comparator
G Comparator
H Comparator
OSC Triangular-wave oscillator
Q1 Comparator-1 control switch
Q2, Q3 Semiconductor switches
R1, R2 Resistors
R3, R4, R5, R6, R7, R8 voltage-dividing resistors
R24 Current detecting resistor
Ref1, Ref2, Ref3 reference voltages
SENS1, SENS2, SENS3 Detection terminals
D1 Diode
C1 Reference-voltage capacitor

BEST MODE FOR CARRYING OUT THE INVENTION

A circuit diagram of a best mode for practicing the invention is shown in FIG. 1. The charger shown in FIG. 1 uses, as an input source Vfc, a fuel cell having relatively large impedance Z when power is supplied. In this embodiment, although the fuel cell is used as the input source Vfc, the present invention can be practiced by using even a solar cell or another one having a relatively large output impedance. An output side of the DC-DC-converter main section 1 is connected in parallel to a secondary battery B.

The charger according to this embodiment is provided with a control circuit 2, and the control circuit 2 includes an operating state detecting circuit 3, a current control circuit 10, and a constant-power-reference-voltage control circuit 20. Details of the control circuit 2 are described below. Voltage-dividing resistors R3 and R4 are connected to the output side of the DC-DC-converter main section 1, and the current control circuit 10 is connected to a node between voltage-dividing resistors R3 and R4. The current control circuit 10 is also connected to the negative electrode of the secondary battery B. The current control circuit 10 is configured so that, when charging of the secondary battery B is initiated, the current control circuit 10 performs constant current charging by using, as a current value determined on the basis of an input power value, a charging current flowing into the secondary battery B, and that, in an end stage in which the voltage of the secondary battery B reaches nearly an output voltage, the charging is stopped by stopping controlling input power to be constant and detecting a rising input voltage. A specific example of the current control circuit 10 is described later.

In addition, the charger according to the present invention includes a voltage comparator #C. The voltage comparator #C can perform level conversion by comparing an output voltage signal detected by the voltage-dividing resistors R3 and R4 and a reference voltage Ref1 with each other, and can output the obtained result to a comparator #B connected to an output of the voltage comparator #C.

The charger according to the present invention includes a differential amplifier #A. The differential amplifier #A is configured to output a control signal by receiving, as inputs, a voltage-control input signal Vset of the constant-power-reference-voltage control circuit 20, which is described later, and an output voltage Vfc of the fuel cell.

The comparator #B outputs a driving signal to a control switch Q1 of the DC-DC-converter main section 1 by comparing a voltage signal from the voltage detector #C, which is obtained by performing level conversion on an output voltage of a load R, and a control signal, oscillated by a triangular-wave oscillator OSC, for stable control.

Figure 2:
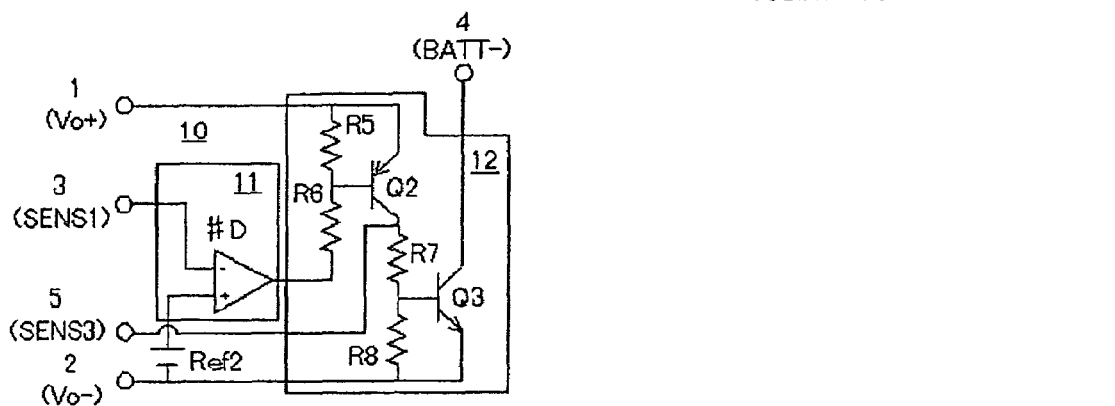
FIG. 2 is a circuit diagram showing an embodiment of a current control circuit included in the charger according to the present invention.

Next, the specific example of the current control circuit 10 is shown in FIG. 2 and is described. The current control circuit 10 includes a comparing circuit 11 for outputting a controlled variable by comparing the output voltage of the charger and a reference voltage Ref2 of the current control circuit 10, and a constant-current control circuit 12 for performing constant current control of the secondary battery B by using the controlled variable. The comparing circuit 11 includes a comparator #D and is configured to output the controlled variable by performing level conversion by using the comparator #D to compare the output voltage and the reference voltage Ref2.

The constant-current control circuit 12 includes voltage-dividing resistors R5 and R6. An end of one voltage-dividing resistor R5 is connected to an output terminal of the comparator #D, and another end of the other voltage-dividing resistor R6 is connected to a positive output terminal of the charger. In addition, a control terminal of a semiconductor switch Q2 is connected to a node between the voltage-dividing resistors R5 and R6, and further the constant-current control circuit 12 includes voltage-dividing resistors R7 and R8. An end of one voltage-dividing resistor R7 is connected to an output terminal of the semiconductor switch Q2, and the other end of the other voltage-dividing resistor R8 is connected to a negative output terminal of the charger.

In addition, a control terminal of a second semiconductor switch Q3 is connected to a node between the voltage-dividing resistors R7 and R8, and the semiconductor switch Q3 is connected to a negative terminal of the secondary battery B. Accordingly, when the output voltage rises, the semiconductor switch Q2 and the second semiconductor switch Q3 are turned on to supply the secondary battery B with power at a constant current, thereby controlling the output voltage of the DC-DC converter so as to be lowered up to a voltage determined by the reference voltage Ref2.

In addition, when the output voltage drops, the semiconductor switch Q2 and the second semiconductor switch Q3 are turned off to suppress power supply to the secondary battery B, thereby controlling the output voltage of the charger to rise to the voltage determined by the reference voltage Ref2.

Figure 3:
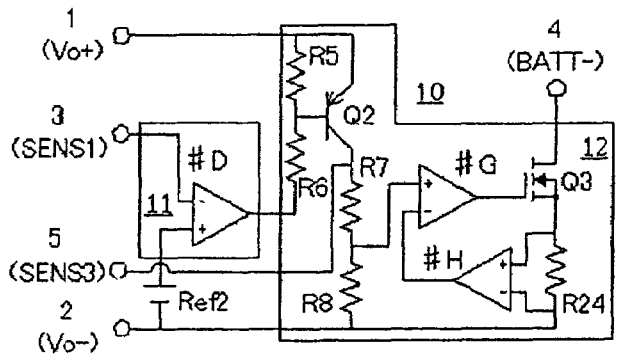
FIG. 3 is a circuit diagram showing an embodiment of a current control circuit different from the current control circuit shown in FIG. 2.

Next, another embodiment of the current control circuit 10 is shown in FIG. 3. Also in this embodiment, the current control circuit 10 includes a comparing circuit 11 for outputting a controlled variable by comparing the output voltage of the charger and a reference voltage Ref2 of the current control circuit 10, and a constant-current control circuit 12 for performing constant current control of the secondary battery B by using the controlled variable. The comparing circuit 11 includes a comparator #D and is configured to output the controlled variable after performing level conversion by using the comparator #D to compare the output voltage and the reference voltage Ref2.

The constant-current control circuit 12 includes voltage-dividing resistors R5 and R6. An end of one voltage-dividing resistor R5 is connected to an output terminal of the comparator #D, and the other end of the other voltage-dividing resistor R6 is connected to a positive output terminal of the charger. In addition, a control terminal of a semiconductor switch Q2 is connected to a node between the voltage-dividing resistors R5 and R6, and the constant-current control circuit 12 includes voltage-dividing resistors R7 and R8. An end of one voltage-dividing resistor R7 is connected to an output terminal of the semiconductor switch Q2, and the other end of the other voltage-dividing resistor R8 is connected to a negative output terminal of the charger.

A detection terminal of a comparator #G is connected to a node between the voltage-dividing resistors R7 and R8, and an output terminal of the comparator #G is connected to a gate terminal of a second semiconductor switch Q3 formed by an FET. The second semiconductor switch Q3 is connected to a negative terminal of the secondary battery B. In addition, an end of a current detecting resistor R24 is connected to a source terminal of the second semiconductor switch Q3, both ends of the current detecting resistor R24 are connected to both input terminals of a comparator #H, respectively, and an output terminal of the comparator #H is connected to a reference terminal of the comparator #G, whereby feedback is performed. Accordingly, when the output voltage rises, the semiconductor switch Q2 and the semiconductor switch Q3 are turned on to supply power to the secondary battery B at a constant current, whereby the output voltage of the charger can be controlled to be lowered to a voltage determined by the reference voltage Ref2. At this time, the maximum value of the constant current can be limited by the voltage-dividing resistors R7 and R8 so that a charging current of the secondary battery B can be arbitrarily set, thus realizing a secure system.

In addition, when the output voltage drops, the semiconductor switch Q2 and the semiconductor switch Q3 are turned off to suppress power supply to the secondary battery B, whereby the output voltage of the charger can be controlled to increase to the voltage determined by the reference voltage Ref2.

Figure 4:
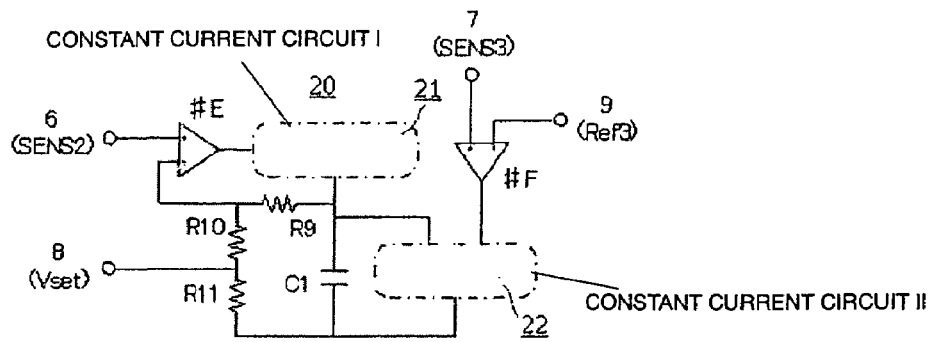
FIG. 4 is a circuit diagram showing an embodiment of a constant-power-reference-voltage control circuit included in the charger according to the present invention.

Next, a specific example of the constant-power-reference-voltage control circuit 20 is shown in FIG. 4 and is described. The constant-power-reference-voltage control circuit 20 includes two constant current circuits 21 and 22, an input-voltage detecting comparator #E, an output-voltage detecting comparator #F, and a reference-voltage capacitor C1. The output-voltage detecting comparator #F is configured so that, when a voltage detected at a detection terminal SENS3 of the current control circuit 10 and a reference voltage Ref3 provided in the exterior of the constant-power-reference-voltage control circuit 20 are compared with each other and an output signal detected by the output-voltage detecting comparator #F is in a drooping state, the output-voltage detecting comparator #F is low, whereby, by using a second constant current circuit 22 to allow the reference-voltage capacitor C1 to discharge, the output voltage is increased to allow the output voltage of the charger to be constant at the voltage determined by the reference voltage Ref2.

The input-voltage detecting comparator is configured so that, when the input voltage and a voltage output from a constant current circuit 21 are compared and an output signal detected by the input-voltage detecting comparator #E is in an excessive power state, the input-voltage detecting comparator is high, so that the reference-voltage capacitor C1 is charged through the first constant current circuit 21, whereby a reference value corresponding to supply power is set. In addition, the constant current circuit 21 outputs a voltage-control input signal Vset to a differential amplifier #A through voltage-dividing resistors R10 and R11, and the differential amplifier #A can output a control signal by receiving, as inputs, the voltage-control input signal Vset and an output voltage Vfc of the fuel cell.

Figure 5:
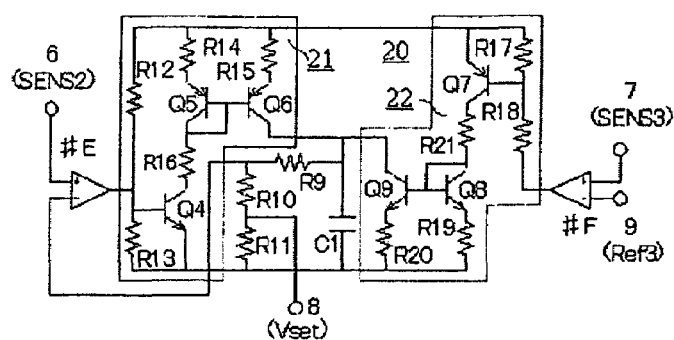
FIG. 5 is a circuit diagram showing a detailed embodiment of the constant-power-reference-voltage control circuit shown in FIG. 4.

Furthermore, specific example configurations of the constant current circuits 21 and 22 included in the constant-power-reference-voltage control circuit 20 are shown in FIG. 5 and are described. The first constant current circuit 21 included in the constant-power-reference-voltage control circuit 20 includes three semiconductor switches Q4, Q5, and Q6, and a control terminal of the first semiconductor switch Q4 is connected to an output terminal of the input-voltage detecting comparator #E. An output terminal of the second semiconductor switch Q5 is connected to an input terminal of the first semiconductor switch Q4, and an output terminal of the input-voltage detecting comparator #E is connected to an input terminal of the second semiconductor switch Q5, wherein when an ON signal is output from the input-voltage detecting comparator #E to the first semiconductor switch Q4, the first semiconductor switch Q4 is turned on so that a current flows in the second semiconductor switch Q5 and the first semiconductor switch Q4. Also, the third semiconductor switch Q6, which is a mirror switch of the second semiconductor switch Q5, is connected to the reference-voltage capacitor C1, wherein when the first semiconductor switch Q4 is turned on the third semiconductor switch Q6 is also turned on so that charging of the reference-voltage capacitor C1 is initiated.

The second constant current circuit 22 included in the constant-power-reference-voltage control circuit 20 includes three semiconductor switches Q7, Q8, and Q9, and a control terminal of the first semiconductor switch Q7 is connected to an output terminal of the output-voltage detecting comparator #F. An input terminal of the second semiconductor switch Q8 is connected to an output terminal of the first semiconductor switch Q7, wherein when an ON signal is output from the output-voltage detecting comparator #F to the first semiconductor switch Q7, the first semiconductor switch Q7 can be turned on to allow a current to flow in the second semiconductor switch Q8 and the first semiconductor switch Q7. Also, the third semiconductor switch Q9, which is a mirror switch of the second semiconductor switch Q8, is connected to the reference-voltage capacitor C1, wherein when the first semiconductor switch Q7 is turned on, the third semiconductor switch Q9 is also turned on, thus allowing the reference-voltage capacitor C1 to initiate discharge.

An operation of the charger having the above-described configuration will be described below. First, when charging of the secondary battery is initiated, the input Vfc decreases. Conversely, the output voltage Vout increases. At this time, since, in the constant-power-reference-voltage control circuit 20, the output voltage is in the drooping state, when the output-voltage detecting comparator #F included in the constant-power-reference-voltage control circuit 20 outputs an ON signal to the first semiconductor switch Q7 of the constant current circuit 22, the first semiconductor switch Q7 is turned on, thus allowing a current to flow in the second semiconductor switch Q8 and the first semiconductor switch Q7. Also, since the third semiconductor switch Q9 is a mirror switch of the second semiconductor switch Q8, when the first semiconductor switch Q7 is turned on, the third semiconductor switch Q9 is also turned on, so that the reference-voltage capacitor C1 initiates discharge.

The discharge of the reference-voltage capacitor C1 increases the supply power. Accordingly, an output voltage Vo rises. When the output voltage Vo rises and exceeds the reference voltage Ref2, the comparator #D provided in the current control circuit 10 outputs a negative controlled variable. The controlled variable is output to the control terminal of the semiconductor switch Q2 through the voltage-dividing resistors R5 and R6, and the semiconductor switch Q2 is turned on. In addition, when the controlled variable is output to the control terminal of the second semiconductor switch Q3 provided in the current control circuit 10 through the voltage-dividing resistors R7 and R8, and the semiconductor switch Q3 is also turned on, a charging current flowing in the secondary battery B is generated, whereby the output voltage Vo can be stably controlled at the voltage determined by the reference voltage Ref2. Also, when the generation of the charging current causes a rise at the detection terminal SENS3 exceeding the reference voltage Ref3, the discharge of the reference-voltage capacitor C1 is stopped, so that output-supply power Pout becomes constant.

Next, after the charger enters constant power charging, the input voltage Vfc becomes constant by the operation for controlling power to be constant. The output voltage Vout is made constant by a drooping voltage of the current control circuit 10. In addition, battery voltage VB is gradually increased such that the output of the DC-DC-converter main section 1 supplies a current to charge the secondary battery B. Also, a charging current Ich is controlled to be constant by the operation of the current control circuit 10, whereby a constant current is maintained.

After charging is initiated, a constant power state is continued for a while. In an end stage of the charging, the battery voltage VB reaches nearly the output voltage Vout, so that the constant current state cannot be maintained. This decreases the charging current Ich to activate an excessive power state, thus raising the input voltage. When the input power of the charger 1 enters an excessive state, the input-voltage detecting comparator #E included in the constant-power-reference-voltage control circuit 20 outputs an ON signal. When the ON signal is output to the first semiconductor switch Q4 of the first constant current circuit 21, the first semiconductor switch Q4 is turned on, thus allowing a current to flow through the second semiconductor switch Q5 and the first semiconductor switch Q4. Also, since the third semiconductor switch Q6 is a mirror switch of the second semiconductor switch Q5, when the first semiconductor switch Q4 is turned on, the third semiconductor switch Q6 is also turned on, so that charging of the reference-voltage capacitor C1 is initiated.

The charging of the reference-voltage capacitor C1 decreases the supply power. Accordingly, the output voltage Vo drops. When the output voltage Vo drops to be below the reference voltage Ref2, the comparator #D provided in the current control circuit 10 outputs a positive controlled variable. The controlled variable is output to the control terminal of the semiconductor switch Q2 through the voltage-dividing resistors R5 and R6, whereby the semiconductor switch Q2 is turned off. In addition, when the controlled variable is output to the control terminal of the semiconductor switch Q3 through the voltage-dividing resistors R7 and R8 so that the semiconductor switch Q3 is also turned off, the charging current flowing in the secondary battery 3 decreases, whereby the output voltage Vo can be stably controlled at the voltage determined by the reference voltage Ref2. Also, the charging of the reference-voltage capacitor C1 is stopped by a voltage at a detection terminal SENS2 which is a detected value of the operating voltage of the charger, so that the output supply power Pout becomes constant.

Furthermore, immediately before completion of charging, by comparing and detecting the input voltage Vfc, which rises due to a decrease in supply power, and a stop-voltage reference which is arbitrarily set in the operating state detecting circuit 2, the control switch Q1 provided in the DC-DC-converter main section 1 is turned off to stop the charging, whereby the charger becomes enable. Furthermore, when the input voltage Vfc reaches an open-circuit voltage due to a decrease in power without using the operating state detecting circuit 2, the DC-DC-converter main section 1 automatically enters a stopped state. Thus, this time may be regarded as completion of charging.

Embodiment 1

Figure 6:
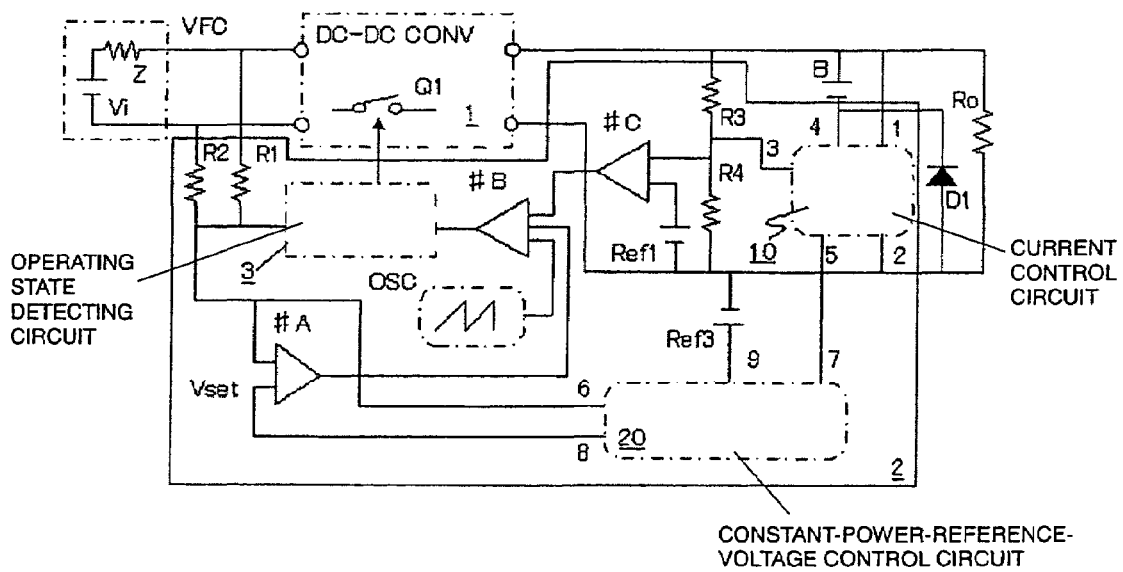
FIG. 6 is a circuit diagram of a best mode for practicing an invention as to a DC-DC converter according to the present invention.
Figure 7:
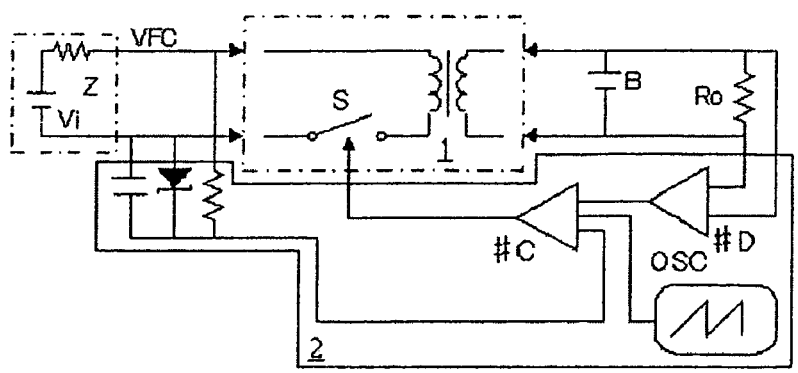
FIG. 7 is a circuit diagram showing a charger of the prior art.
Figure 8:
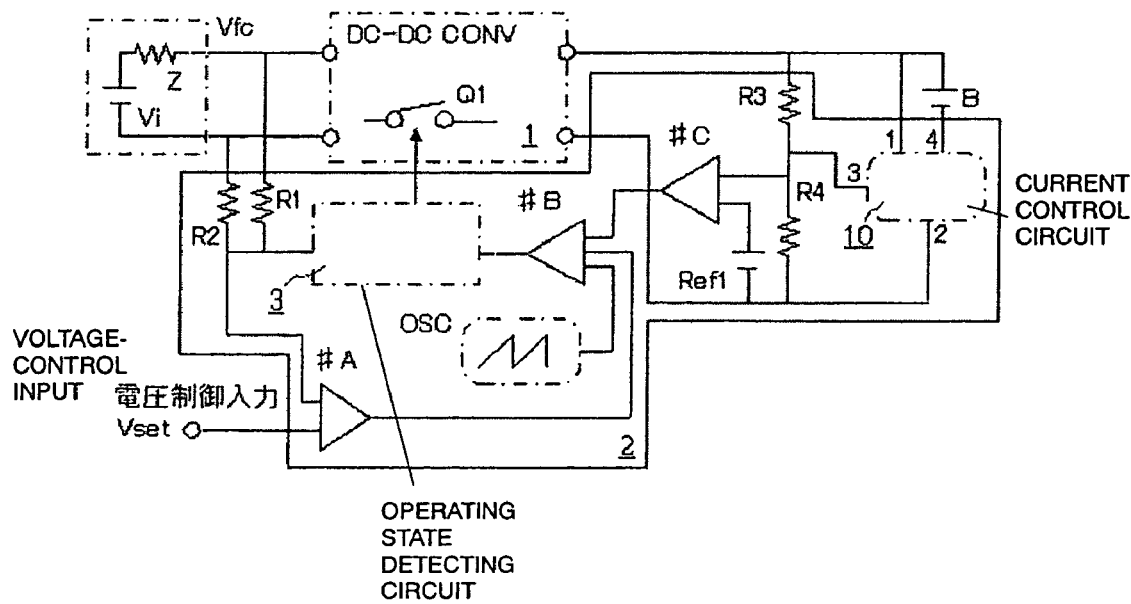
FIG. 8 is a circuit diagram of a charger of the prior art different from that shown in FIG. 7.

Next, a circuit diagram of an embodiment of a DC-DC converter having a charging function is shown in FIG. 6. In the DC-DC converter shown in FIG. 6, a fuel cell having relatively large impedance Z when power is supplied is used as an input source Vfc. In this embodiment, although the fuel cell is used as the input source Vfc, the present invention can be practiced by using even a solar cell or another one having a relatively large output impedance. A load Ro and a secondary battery B are connected in parallel to an output side of a DC-DC-converter main section 1. The other elements are substantially similar to those of the charger in the foregoing embodiment.

Description an operation of the DC-DC converter having the above configuration will be described below. First, when a current flowing in the load Ro is in a state (drooping state where it is equal to or less than the voltage determined by the reference voltage Ref2) where it exceeds a rated value, the current control circuit 10 does not function, and currents are supplied from a DC-DC-converter output and the secondary battery B. The secondary battery B performs power supply through a diode D1. In a constant-power-reference-voltage control circuit 20, when the output-voltage detecting comparator #F outputs an ON signal to the first semiconductor switch Q7 of the constant current circuit 22, the first semiconductor switch Q7 is turned on, thus allowing a current to flow in the second semiconductor switch Q8 and the first semiconductor switch Q7. In addition, since the third semiconductor switch Q9 is a mirror switch of the second semiconductor switch Q8, when the first semiconductor switch Q7 is turned on, the third semiconductor switch Q9 is also turned on, so that the reference-voltage capacitor C1 initiates discharge.

The power to be supplied increases due to the discharge of the reference-voltage capacitor C1. Accordingly, the output voltage Vo rises. When the output voltage Vo rises and exceeds the reference voltage Ref2, a comparator #D provided in the current control circuit 10 outputs a negative controlled variable. The controlled variable is output to the control terminal of the semiconductor switch Q2 through the voltage-dividing resistors R5 and R6, so that the semiconductor switch Q2 is turned on. Also, when the controlled variable is output to the control terminal of the second semiconductor switch Q3 in the current control circuit 10 through the voltage-dividing resistors R7 and R8, and the second semiconductor switch Q3 is also turned on, a charging current flowing in the secondary battery B is generated, whereby the output voltage Vo can be stably controlled at the voltage determined by the reference voltage Ref2. In addition, when the generation of the charging current causes a rise at the detection terminal SENS3, and it exceeds the reference voltage Ref3, the discharge of the reference-voltage capacitor C1 is stopped, so that output-supply power Pout becomes constant.

Next, when the input power to the DC-DC converter is in an excessive state, power is supplied to the load Ro from the DC-DC converter, and the secondary battery B enters a charging state at a maximum current. The output voltage is a voltage determined by a reference voltage Ref1. Also, in the constant-power-reference-voltage control circuit 20, when the input-voltage detecting comparator #E outputs an ON signal to the first semiconductor switch Q4 of the first constant current circuit 21, the first semiconductor switch Q4 is turned on, so that a current flows in the second semiconductor switch Q5 and the first semiconductor switch Q4. Also, since the third semiconductor switch Q6 is a mirror switch of the second semiconductor switch Q5, when the first semiconductor switch Q4 is turned on, the third semiconductor switch Q6 is also turned on, so that the reference-voltage capacitor C1 initiates charging.

Due to the charging of the reference-voltage capacitor C1, power to be supplied decreases. Accordingly, the output voltage Vo drops. When the output voltage Vo drops to be below the reference voltage Ref2, the comparator #D provided in the current control circuit 10 outputs a positive controlled variable. The controlled variable is output to the control terminal of the semiconductor switch Q2 through the voltage-dividing resistors R5 and R6, so that the semiconductor switch Q2 is turned off. In addition, when the controlled variable is output to the control terminal of the semiconductor switch Q3 through the voltage-dividing resistors R7 and R8, and the second semiconductor switch Q3 is turned off, the charging current flowing in the secondary battery B decreases, whereby the output voltage Vo can be stably controlled at the voltage determined by the reference voltage Ref2. Also, the charging of the reference-voltage capacitor C1 is stopped at a voltage at the detection terminal SENS2 which is a detected value of the operating voltage of the DC-DC converter, so that the output supply power Pout becomes constant.

INDUSTRIAL APPLICABILITY

According to a charger of the present invention, a control circuit of the charger includes a constant-power-reference-voltage control circuit, and the constant-power-reference-voltage control circuit has a configuration in which, when an output of the charger is in a drooping state, by decreasing in reference voltage output voltage is raised, whereby power is made constant, and, when an input to the charger rises, by raising in reference voltage, a reference value that matches the supply power is set. In this configuration, the reference voltage can be gradually changed, so that it is possible to prevent deterioration of fuel cell that is weak in a rapid change in output characteristics. Also, this can apply to a DC-DC converter according to the present invention. In addition, since the output voltage is stabilized at a set drooping point, stable power can be supplied to a load.

The invention claimed is:

1. A charger for charging a secondary battery through a charging unit configured to control input power to be constant by using, as an input source, a fuel cell or a solar cell, having a relatively large impedance in a power-supply mode, comprising: a current-control circuit that is connected to the secondary battery, and a constant-power-reference-voltage control circuit that is connected between the current-control circuit and an input of the charger, wherein the constant-power-reference-voltage control circuit is configured so that, when an output of the charger is in a drooping state, by decreasing a reference voltage to increase supply power, constant power is obtained at a voltage determined by output-voltage-stabilizing control of the charger, and, when input power to the charger is in an excessive state, by raising the reference voltage, a reference value corresponding to the supply power is set, wherein the constant-power-reference-voltage control circuit includes two constant current circuits, an input-voltage detecting comparator, an output-voltage detecting comparator, and a reference-voltage capacitor, and the constant-power-reference-voltage control circuit is configured so that, when an output detected by the output-voltage detecting comparator is in a drooping state, by causing the reference-voltage capacitor to discharge through the constant current circuit to raise the output voltage, constant power is obtained at the voltage determined by controlling output voltage of the charger to be stabilized, and, when input power detected by the input-voltage detecting comparator is in an excessive state, by charging the reference-voltage capacitor through the constant current circuit, the reference value corresponding to the supply power is set.

2. A control circuit provided in a charger for charging a secondary battery through a charger unit, configured to control input power to be constant by using, as an input source, a fuel cell, or a solar cell, having a relatively large impedance in a power-supply mode, comprising: a current-control circuit that is connected to the secondary battery, and a constant-power-reference-voltage control circuit that is connected between the current-control circuit and an input of the charger, wherein the constant-power-reference-voltage control circuit is configured so that, when an output of the charger is in a drooping state, by decreasing a reference voltage to increase supply power, constant power is obtained at a voltage determined by output-voltage-stabilizing control of the charger, and, when input power to the charger is in an excessive state, by raising the reference voltage, a reference value corresponding to the supply power is set, and wherein the constant-power-reference-voltage control circuit includes two constant current circuits, an input-voltage detecting comparator, an output-voltage detecting comparator, and a reference-voltage capacitor, and wherein the constant-power-reference-voltage control circuit is configured so that, when an output detected by the output-voltage detecting comparator is in a drooping state, by causing the reference-voltage capacitor to discharge through the constant current circuit to raise the output voltage, constant power is obtained at the voltage determined by controlling output voltage of the charger to be stabilized, and, when input power detected by the input-voltage detecting comparator is in an excessive state, by charging the reference-voltage capacitor through the constant current circuit, the reference value corresponding to the supply power is set.

3. The control circuit in the charger, according to claim 2, further including a secondary battery provided at an output of the charger in parallel to an arbitrary load, and a current control circuit connected to the secondary battery, wherein the current control circuit is configured so that, by performing control so that, when a current in the load decreases, a charging current flowing into the secondary battery is increased, and, when the current in the load increases, the charging current to the secondary battery is decreased, whereby an output voltage is maintained at a set drooping voltage.

4. A DC-DC converter for controlling input power to be constant by using, as an input source, a fuel cell or a solar cell, having a relatively large output impedance in a power-supply mode.

wherein the DC-DC converter includes a charger for charging a secondary battery through a charging unit configured to control input power to be constant, the charger having a current-control circuit that is connected to the secondary battery, and the current-control circuit including a constant-power-reference-voltage control circuit that is connected between the current-control circuit and an input of the DC-DC converter, wherein the secondary battery is provided at an output in parallel to an arbitrary load.

wherein the constant-power-reference-voltage control circuit is configured so that, when an output of the DC-DC converter is in a drooping state, by decreasing a reference voltage to increase supply power, constant power is obtained at a voltage determined by controlling output voltage of the DC-DC converter to be stabilized, and, when input power to the DC-DC converter is in an excessive state, by raising the reference voltage, a reference value corresponding to the supply power is set, wherein the constant-power-reference-voltage control circuit includes two constant current circuits, an input-voltage detecting comparator, an output-voltage detecting comparator, and a reference-voltage capacitor, and wherein the constant-power-reference-voltage control circuit is configured so that, when an output detected by the output-voltage detecting comparator is in a drooping state, by causing the reference-voltage capacitor to discharge through the constant current circuit to raise the output voltage, constant power is obtained at the voltage determined by controlling output voltage of the DC-DC converter to be stabilized, and, when input power detected by the input-voltage detecting comparator is in an excessive state, by charging the reference-voltage capacitor through the constant current circuit, the reference value corresponding to the supply power is set.

5. A control circuit in a DC-DC converter for controlling input power to be constant by using, as an input source, a fuel cell or a solar cell, having a relatively large output impedance in a power-supply mode, wherein the DC-DC converter includes a charger for charging a secondary battery through a charging unit configured to control input power to be constant, wherein the control circuit includes a constant-power-reference-voltage control circuit in which, when an output of the DC-DC converter is in a drooping state, by decreasing a reference voltage to increase supply power, constant power is obtained at a voltage determined by controlling output voltage of the DC-DC converter to be stabilized, and, when input power to the DC-DC converter is in an excessive state, by raising the reference voltage, a reference value corresponding to the supply power is set, wherein the constant-power-reference-voltage control circuit includes two constant current circuits, an input-voltage detecting comparator, an output-voltage detecting comparator, and a reference-voltage capacitor, and wherein the constant-power-reference-voltage control circuit is configured so that, when an output detected by the output-voltage detecting comparator is in a drooping state, by causing the reference-voltage capacitor to discharge through the constant current circuit to raise the output voltage, constant power is obtained at the voltage determined by controlling output voltage of the DC-DC converter to be stabilized, and, when input power detected by the input-voltage detecting comparator is in an excessive state, by charging the reference-voltage capacitor through the constant current circuit, the reference value corresponding to the supply power is set.

6. The control circuit in the DC-DC converter according to claim 5, further including a secondary battery provided at an output of the DC-DC converter in parallel to an arbitrary load, and a current control circuit connected to the secondary battery, wherein the current control circuit is configured so that when a current in the load decreases, a charging current flowing into the secondary battery is controlled to be increased, and, when the current in the load increases, the charging current to the secondary battery is decreased, so that an output voltage is maintained at a set drooping voltage.

* * * * *